US011993753B2

(12) United States Patent
Eswararao et al.

(10) Patent No.: US 11,993,753 B2
(45) Date of Patent: May 28, 2024

(54) ANTIFOULANT FORMULATION COMPRISING AN ALKYLBENZENE SULFONATE SALT AND POLYISOSUCCININIC ANHYDRIDE COMBINATION AND APPLICATIONS THEREOF

(71) Applicant: Hindustan Petroleum Corporation Limited, Bangalore (IN)

(72) Inventors: Doni Eswararao, Bangalore (IN); Kanala Raghava Krishna, Bangalore (IN); Madala Sairamu, Bangalore (IN); Mangala Ramkumar, Bangalore (IN); Bojja Ramachandrarao, Bangalore (IN); Nettam Venkateswarlu Choudary, Bangalore (IN); Gandham Sriganesh, Bangalore (IN)

(73) Assignee: Hindustan Petroleum Corporation Limited, Bangalore (IN)

( * ) Notice: Subject to any disclaimer, the term of this patent is extended or adjusted under 35 U.S.C. 154(b) by 234 days.

(21) Appl. No.: 17/615,434

(22) PCT Filed: Mar. 31, 2020

(86) PCT No.: PCT/IN2020/050307

§ 371 (c)(1),
(2) Date: Nov. 30, 2021

(87) PCT Pub. No.: WO2020/255155

PCT Pub. Date: Dec. 24, 2020

(65) Prior Publication Data

US 2022/0228076 A1 Jul. 21, 2022

(30) Foreign Application Priority Data

Jun. 19, 2019 (IN) ............................. 201941024435

(51) Int. Cl.
*C11D 1/22* (2006.01)
*C10G 75/04* (2006.01)

(52) U.S. Cl.
CPC ................ *C10G 75/04* (2013.01); *C11D 1/22* (2013.01)

(58) Field of Classification Search
CPC ... C11D 1/22; C11D 2111/20; C11D 2111/22; C11D 3/0073; C11D 3/18; C11D 3/185
See application file for complete search history.

(56) References Cited

U.S. PATENT DOCUMENTS

| | | | | |
|---|---|---|---|---|
| 2,976,211 | A | 3/1961 | Lindner | |
| 3,080,280 | A | 3/1963 | Lindner | |
| 5,110,997 | A | 5/1992 | Dickakian | |
| 2015/0218468 | A1* | 8/2015 | Ovaskainen | C10G 75/04 585/4 |
| 2018/0079977 | A1* | 3/2018 | Solomon | F17D 1/17 |
| 2019/0078030 | A1* | 3/2019 | Naga | C10G 75/02 |
| 2019/0203131 | A1* | 7/2019 | Yu | C10G 75/04 |

FOREIGN PATENT DOCUMENTS

| | | |
|---|---|---|
| CN | 101318916 A | 12/2008 |
| GB | 1139172 | 1/1969 |
| WO | WO-2017/141077 A1 | 8/2017 |

OTHER PUBLICATIONS

International Search Report & Written Opinion for PCT/IB2020/050307 dated Jul. 17, 2020, 9 pgs.
XP007119505, Antifoulant for ethylene dichloride processing, Research Disclosure, Kenneth Mason Publications, Hampshire, UK, GB, vol. 356, No. 28, Dec. 1, 1993.
"Antifoulant for Ethylene Dichloride Processing", Research Disclosure, Kenneth Mason Publications, Hampshire, UK, GB, vol. 356, No. 28, Dec. 1, 1993; XP007119505; 3 pgs.

* cited by examiner

*Primary Examiner* — Charles I Boyer
(74) *Attorney, Agent, or Firm* — Blank Rome LLP

(57) ABSTRACT

The present disclosure relates to an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkyl amine. It also relates to the process of preparation of the said antifoulant formulation. The instant disclosure further relates to the method of inhibiting fouling tendency in the heat exchangers of crude oil, crude blends, short residue, involving the said antifoulant formulation.

13 Claims, 1 Drawing Sheet

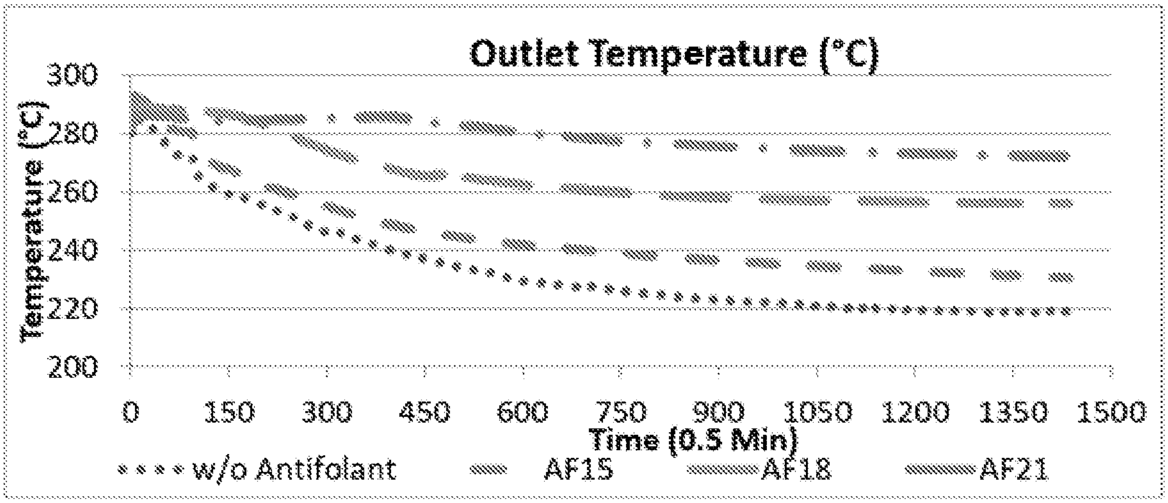
Outlet Temperature (°C)
300
280
260
240
220
200
Temperature (°C)
0
150
300
450
600
750
900
1050
1200
1350
1500
Time (0.5 Min)
w/o Antifolant
AF15
AF18
AF21

ANTIFOULANT FORMULATION COMPRISING AN ALKYLBENZENE SULFONATE SALT AND POLYISOSUCCININIC ANHYDRIDE COMBINATION AND APPLICATIONS THEREOF

RELATED APPLICATIONS

The present application is a national phase of PCT/IN2020/050307, filed Mar. 31, 2020, which claims the benefit of Indian Patent Application No. 201941024435, filed Jun. 19, 2019. The entire disclosures of which are hereby incorporated by reference.

TECHNICAL FIELD

The present disclosure relates to the field of hydrocarbon refining. In particular, it pertains to antifouling formulations for reducing fouling in heat exchangers. The present disclosure further relates to a process for preparing the antifouling formulations and the method of inhibiting fouling in a hydrocarbon medium.

BACKGROUND

The accumulation of unwanted materials on heat transfer surfaces is called fouling. It is a dynamic phenomenon which changes with time and may have a significantly negative impact on the thermal and mechanical performance as well as the operational efficiency of units, such as crude preheat exchangers, furnaces, hydrotreater exchangers, reactor beds, fluid catalytic cracking unit (FCCU) slurry exchangers and thermal cracking process exchangers.

Multiple factors impact fouling including crude type, equipment design, flow rates, temperature, unit's operational severity, and fluid characteristics. All these lead to energy loss and increasing maintenance cost, reduced equipment lifetime, throughput loss, and safety problems. Hence, modern refineries strive for reliability and processing flexibility, with longer run lengths and minimal equipment fouling.

The unwanted materials known as fouling deposits can be scale, suspended solids, and insoluble salts. Broadly, the fouling deposits can be categorized into two major types, inorganic and organic. In the case of inorganic fouling, corrosion of process equipment will form ferrous-based corrosion products such as iron sulfide or ferric oxide which will deposit in exchangers, mainly in areas with lower velocities. Solid inorganic contaminants such as sand and silt can also deposit in the exchanger and cause hydraulic or thermal obstructions. Organic fouling in a crude unit results from the precipitation of organic components, such as, asphaltenes, high molecular weight hydrocarbons which become insoluble in the system. The asphaltenes become unstable because of the blending of incompatible crudes and get precipitated out due to high heating temperatures of crudes. Further, the asphaltenes and other heavier organic molecules are known to thermally degrade to coke when exposed to high heater tube surface temperatures.

Organic fouling is usually caused by polymerization reactions initiated by fouling precursors that are present in crude. Two polymerization mechanisms have been identified, "free radical" and "non-free radical" reactions. The most common mechanism is "free radical" polymerization, where unsaturated components, such as olefins and diolefins, react to form longer chain molecules. The molecule chain length increases to the point that solubility is exceeded, and deposition occurs. Non-free radical polymerization mechanism occurs mainly as a result of condensation reactions involving components such as carboxylic acid and nitrogen compounds etc. To properly control fouling, the differences between these two categories must be thoroughly understood and accounted for when identifying the fouling mechanisms.

Fouling of refinery process equipment is a common problem resulting in severe economic penalties due to energy loss and has significant safety concerns. Several antifoulant formulations comprising antifouling formulations comprising of ionic surfactants based on alkylbenzene sulfonates are known in the literature, such as U.S. Pat. Nos. 2,976,211, 3,080,280, 5,110,997, and WO 2017141077, etc. However, a single antifouling formulation working on all types of crudes, crude blends, short residue and other refinery streams and units (e.g., diesel hydrodesulfurization, i.e. DHDS unit) heat exchangers and, providing an efficient reduction in fouling is very scarce in the prior art. Therefore, in light of the huge losses due to fouling worldwide and scarce availability of antifouling formulations, efficient antifoulant formulations are direly required.

SUMMARY

In an aspect of the present disclosure there is provided an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkyl amine.

In another aspect of the present disclosure there is provided a process of preparing the antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkyl amine, the process comprising: (a) contacting at least one ammonium salt of linear alkyl benzene sulphonic acid, at least one aromatic hydrocarbon, at least one diluent, polyisobutylene succinic anhydride; and, at least one alkyl amine to obtain a first mixture; and (b) processing the first mixture to obtain the antifoulant formulation.

In yet another aspect of the present disclosure, there is provided a method of inhibiting fouling in a liquid hydrocarbon medium, the method comprising contacting the antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkyl amine, and the liquid hydrocarbon medium in the preheat exchangers of crude and short residue.

These and other features, aspects, and advantages of the present subject matter will be better understood concerning the following description and appended claims. This summary is provided to introduce a selection of concepts in a simplified form. This summary is not intended to be used to limit the scope of the claimed subject matter.

BRIEF DESCRIPTION OF DRAWINGS

The detailed description is described concerning the accompanying FIGURE. In the FIGURE, the left-most digit(s) of a reference number identifies the FIGURE in which the reference number first appears. The same numbers are used throughout the drawings to reference like features and components.

FIG. 1 illustrates the graphical representation of the evaluation of Crude-1 against antifoulant formulation, in accordance with an implementation of the present disclosure.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a," "an" and "the" are used to refer to one or more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of elements or steps but not the exclusion of any other element or step or group of elements or steps.

The term "including" is used to mean "including but not limited to". "Including" and "including but not limited to" are used interchangeably.

The term "between" should be understood as being inclusive of the limits.

The term "API" is a commonly used index of the density of crude oil or refined products. API stands for the American Petroleum Institute, which is the industry organization that created this measure.

The term "ambient" in the present disclosure refers to a temperature in the range of 25° C. to 37° C.

Unless defined otherwise, all technical and scientific terms used herein have the same meaning as commonly understood to one of ordinary skill in the art to which this disclosure belongs. Although methods and materials similar or equivalent to those described herein can be used in the practice or testing of the disclosure, the preferred methods, and materials are now described. All publications mentioned herein are incorporated herein by reference.

Molar equivalent ratios of components may be presented herein in a range format. It is to be understood that such range format is used merely for convenience and brevity and should be interpreted flexibly to include not only the numerical values explicitly recited as the limits of the range but also to include all the individual numerical values or sub-ranges encompassed within that range as if each numerical value and sub-range is explicitly recited. For example, a temperature range of about 40° C. to about 50° C. should be interpreted to include not only the explicitly recited limits of about 40° C. to about 50° C., but also to include sub-ranges, such as 45° C. to 48° C., and so forth, as well as individual amounts, including fractional amounts, within the specified ranges, such as 42.2° C., 40.6° C., and 49.3° C., for example.

The present disclosure is not to be limited in scope by the specific embodiments described herein, which are intended for the purposes of exemplification only. Functionally equivalent products, compositions, and methods are clearly within the scope of the disclosure, as described herein.

As discussed in the background section, there are multiple factors impacting fouling, which lead to energy loss and increased maintenance cost, reduced equipment lifetime, throughput loss, and safety problems. Hence, in modern refineries, efficient antifoulant formulations with longer run length are required. In order to combat the above-mentioned issues, the present disclosure provides antifouling formulations comprising (a) at least one ammonium salt of linear alkyl benzene sulphonic acid; (b) at least one aromatic hydrocarbon; (c) at least one diluent; (d) polyisobutylene succinic anhydride; and (e) at least one alkyl amine. The present antifoulant formulations, when evaluated for a series of crudes and vacuum residue using refinery fouling process simulator (RFPS) showed excellent results compared to control experiments without the antifoulant formulation.

In an embodiment of the present disclosure, there is provided an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkyl amine.

In an embodiment of the present disclosure, there is provided an antifoulant formulation as described herein, wherein the at least one ammonium salt of linear alkyl benzene sulphonic acid to the at least one aromatic hydrocarbon weight ratio is in the range of 1:1-10:1.

In an embodiment of the present disclosure, there is provided an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkyl amine, wherein the at least one ammonium salt of linear alkyl benzene sulphonic acid to the at least one aromatic hydrocarbon weight ratio is in the range of 1:1-10:1.

In an embodiment of the present disclosure, there is provided an antifoulant formulation as described herein, wherein the at least one ammonium salt of linear alkyl benzene sulphonic acid to the polyisobutylene succinic anhydride weight ratio is in the range of 0.25:1-10:1. In another embodiment of the present disclosure, the at least one ammonium salt of linear alkyl benzene sulphonic acid to the polyisobutylene succinic anhydride weight ratio is in the range of 0.25:1-4:1. In yet another embodiment of the present disclosure, the at least one ammonium salt of linear alkyl benzene sulphonic acid to the polyisobutylene succinic anhydride weight ratio is in the range of 0.25:1-2.5:1.

In an embodiment of the present disclosure, there is provided an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkylamine, wherein the at least one ammonium salt of linear alkyl benzene sulphonic acid to the polyisobutylene succinic anhydride weight ratio is in the range of 0.25:1-10:1.

In an embodiment of the present disclosure, there is provided an antifoulant formulation comprising: (a) at least one ammonium salt of linear alkyl benzene sulphonic acid;

(b) at least one aromatic hydrocarbon; (c) at least one diluent; (d) polyisobutylene succinic anhydride; and (e) at least one alkylamine, wherein the at least one ammonium salt of linear alkyl benzene sulphonic acid to the polyisobutylene succinic anhydride weight ratio is in the range of 0.25:1-4:1.

In an embodiment of the present disclosure, there is provided an antifoulant formulation as described herein, wherein the at least one ammonium salt of linear alkyl benzene sulphonic acid to the at least one alkyl amine weight ratio is in the range of 1:1-20:1.

In an embodiment of the present disclosure, there is provided an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkylamine, wherein the at least one ammonium salt of linear alkyl benzene sulphonic acid to the at least one alkyl amine weight ratio is in the range of 1:1-20:1.

In an embodiment of the present disclosure, there is provided an antifoulant formulation as described herein, wherein the at least one ammonium salt of linear alkyl benzene sulphonic acid to the at least one diluent weight ratio is in the range of 0.05:1-0.4:1.

In an embodiment of the present disclosure, there is provided an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkylamine, wherein the at least one ammonium salt of linear alkyl benzene sulphonic acid to the at least one diluent weight ratio is in the range of 0.05:1-0.4:1.

In an embodiment of the present disclosure, there is provided an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkylamine, wherein the at least one ammonium salt of linear alkyl benzene sulphonic acid to the at least one aromatic hydrocarbon weight ratio is in the range of 1:1-10:1, the at least one ammonium salt of linear alkyl benzene sulphonic acid to the polyisobutylene succinic anhydride weight ratio is in the range of 0.25:1-10:1, the at least one ammonium salt of linear alkyl benzene sulphonic acid to the at least one alkyl amine weight ratio is in the range of 1:1-20:1, and the at least one ammonium salt of linear alkyl benzene sulphonic acid to the at least one diluent weight ratio is in the range of 0.05:1-0.4:1.

In an embodiment of the present disclosure, there is provided an antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkylamine, wherein the at least one ammonium salt of linear alkyl benzene sulphonic acid to the at least one aromatic hydrocarbon weight ratio is in the range of 1:1-10:1, the at least one ammonium salt of linear alkyl benzene sulphonic acid to the polyisobutylene succinic anhydride weight ratio is in the range of 0.25:1-4:1, the at least one ammonium salt of linear alkyl benzene sulphonic acid to the at least one alkyl amine weight ratio is in the range of 1:1-20:1, and the at least one ammonium salt of linear alkyl benzene sulphonic acid to the at least one diluent weight ratio is in the range of 0.05:1-0.4:1.

In another embodiment of present disclosure, there is provided an antifoulant formulation as described herein, wherein the at least one ammonium salt of linear alkyl benzene sulphonic acid has a weight percentage in the range of 5-20% with respect to the formulation; the at least one aromatic hydrocarbon has a weight percentage in the range of 2-5% with respect to the formulation; the at least one diluent has a weight percentage in the range of 50-85% with respect to the formulation; the polyisobutylene succinic anhydride has a weight percentage in the range of 5-20% with respect to the formulation; the at least one alkyl amine has a weight percentage in the range of 1-5% with respect to the formulation.

In an embodiment of the present disclosure, there is provided an antifoulant formulation comprising: (a) at least one ammonium salt of linear alkyl benzene sulphonic acid having a weight percentage in the range of 5-20% with respect to the formulation; (b) at least one aromatic hydrocarbon having a weight percentage in the range of 2-5% with respect to the formulation; (c) at least one diluent having a weight percentage in the range of 50-85% with respect to the formulation; (d) polyisobutylene succinic anhydride having a weight percentage in the range of 5-20% with respect to the formulation; and (e) at least one alkyl amine having a weight percentage in the range of 1-5% with respect to the formulation.

In another embodiment of present disclosure, there is provided an antifoulant formulation comprising: (a) at least one ammonium salt of linear alkyl benzene sulphonic acid having a weight percentage in the range of 10-20% with respect to the formulation; (b) at least one aromatic hydrocarbon having a weight percentage in the range of 2.5-3.5% with respect to the formulation; (c) at least one diluent having a weight percentage in the range of 60-85% with respect to the formulation; (d) polyisobutylene succinic anhydride having a weight percentage in the range of 5-15% with respect to the formulation; and (e) at least one alkyl amine having a weight percentage in the range of 1-3% with respect to the formulation.

In another embodiment of present disclosure, there is provided an antifoulant formulation comprising: (a) at least one ammonium salt of linear alkyl benzene sulphonic acid having a weight percentage in the range of 10% with respect to the formulation; (b) at least one aromatic hydrocarbon having a weight percentage in the range of 3% with respect to the formulation; (c) at least one diluent having a weight percentage in the range of 75% with respect to the formulation; (d) polyisobutylene succinic anhydride having a weight percentage of 5% with respect to the formulation; and (e) at least one alkyl amine having a weight percentage in the range of 3% with respect to the formulation.

In another embodiment of present disclosure, there is provided an antifoulant formulation comprising: (a) at least one ammonium salt of linear alkyl benzene sulphonic acid having a weight percentage in the range of 10% with respect to the formulation; (b) at least one aromatic hydrocarbon having a weight percentage in the range of 3% with respect to the formulation; (c) at least one diluent having a weight percentage in the range of 75% with respect to the formulation; (d) polyisobutylene succinic anhydride having a weight percentage of 10% with respect to the formulation; and (e) at least one alkyl amine having a weight percentage in the range of 3% with respect to the formulation.

In another embodiment of present disclosure, there is provided an antifoulant formulation comprising: (a) at least one ammonium salt of linear alkyl benzene sulphonic acid having a weight percentage in the range of 20% with respect to the formulation; (b) at least one aromatic hydrocarbon having a weight percentage in the range of 3% with respect to the formulation; (c) at least one diluent having a weight percentage in the range of 65% with respect to the formulation; (d) polyisobutylene succinic anhydride having a weight percentage of 10% with respect to the formulation; and (e) at least one alkyl amine having a weight percentage in the range of 2% with respect to the formulation.

In another embodiment of present disclosure, there is provided an antifoulant formulation as described herein, wherein the at least one aromatic hydrocarbon is naphthalene, wherein naphthalene may be optionally substituted with $C_{1-6}$ alkyl, $C_{1-6}$ haloalkyl, $C_{2-6}$ alkenyl, $C_{2-6}$ alkynyl, $C_{1-6}$ alkoxy, $C_{3-6}$ cycloalkyl, or $C_{5-6}$ aryl. In yet another embodiment of the present disclosure, the at least one aromatic hydrocarbon is naphthalene.

In another embodiment of present disclosure, there is provided an antifoulant formulation as described herein, wherein the at least one diluent is selected from the group consisting of light cycle oil, kerosene, aromatic-rich hydrocarbon diluents, diesel, mineral turpentine oil (MTO), and combinations thereof. In another embodiment of the present disclosure, the at least one diluent is light cycle oil. In yet another embodiment, the at least one diluent is kerosene.

In another embodiment of present disclosure, there is provided an antifoulant formulation as described herein, wherein the at least one alkylamine is selected from the group consisting of $C_{12}$ amine, $C_8$ amine, $C_9$ amine, $C_{10}$ amine, $C_{11}$ amine, $C_{13}$ amine, $C_{14}$ amine, $C_{16}$ amine, $C_{17}$ amine, $C_{18}$ amine, and combinations thereof. In another embodiment of the present disclosure, the at least one alkylamine is $C_{12}$ amine. In yet another embodiment of the present disclosure, the at least one alkylamine is lauryl amine.

In an embodiment of the present disclosure, there is provided an antifoulant formulation comprising: (a) at least one ammonium salt of linear alkyl benzene sulphonic acid; (b) at least one aromatic hydrocarbon is naphthalene, wherein naphthalene may be optionally substituted with $C_{1-6}$ alkyl, $C_{1-6}$ haloalkyl, $C_{2-6}$ alkenyl, $C_{2-6}$ alkynyl, $C_{1-6}$ alkoxy, $C_{3-6}$ cycloalkyl, or $C_{5-6}$ aryl; (c) at least one diluent selected from the group consisting of light cycle oil, kerosene, aromatic-rich hydrocarbon diluents, diesel, mineral turpentine oil (MTO), and combinations thereof; (d) polyisobutylene succinic anhydride; and (e) at least one alkyl amine selected from the group consisting of Cu amine, $C_8$ amine, $C_9$ amine, $C_{10}$ amine, $C_{11}$ amine, $C_{13}$ amine, $C_{14}$ amine, $C_{16}$ amine, $C_{17}$ amine, $C_{18}$ amine, and combinations thereof.

In an embodiment of the present disclosure, there is provided an antifoulant formulation comprising: (a) at least one ammonium salt of linear alkyl benzene sulphonic acid; (b) at least one aromatic hydrocarbon is naphthalene; (c) at least one diluent selected from light cycle oil, or kerosene; (d) polyisobutylene succinic anhydride; and (e) at least one alkyl amine is $C_{12}$ amine.

In an embodiment of the present disclosure, there is provided an antifoulant formulation comprising: (a) at least one ammonium salt of linear alkyl benzene sulphonic acid having a weight percentage in the range of 5-20% with respect to the formulation; (b) at least one aromatic hydrocarbon is naphthalene, wherein naphthalene may be optionally substituted with $C_{1-6}$ alkyl, $C_{1-6}$ haloalkyl, $C_{2-6}$ alkenyl, $C_{2-6}$ alkynyl, $C_{1-6}$ alkoxy, $C_{3-6}$ cycloalkyl, or $C_{5-6}$ aryl, and having a weight percentage in the range of 2-5% with respect to the formulation; (c) at least one diluent selected from the group consisting of light cycle oil, kerosene, aromatic-rich hydrocarbon diluents, diesel, mineral turpentine oil (MTO), and combinations thereof, and having a weight percentage in the range of 50-85% with respect to the formulation; (d) polyisobutylene succinic anhydride having a weight percentage in the range of 5-20% with respect to the formulation; and (e) at least one alkyl amine selected from the group consisting of $C_{12}$ amine, $C_8$ amine, $C_9$ amine, $C_{10}$ amine, $C_{11}$ amine, $C_{13}$ amine, $C_{14}$ amine, $C_{16}$ amine, $C_{17}$ amine, $C_{18}$ amine, and combinations thereof, and having a weight percentage in the range of 1-5% with respect to the formulation.

In another embodiment of present disclosure, there is provided a process of preparing the antifoulant formulation as described herein, said process comprising: (a) contacting at least one ammonium salt of linear alkyl benzene sulphonic acid, at least one aromatic hydrocarbon, at least one diluent, polyisobutylene succinic anhydride; and, at least one alkyl amine to obtain a first mixture; and (b) processing the first mixture to obtain the antifoulant formulation.

In another embodiment of present disclosure, of preparing the antifoulant formulation as described herein, wherein processing the first mixture is carried out a temperature in the range of 40-50° C. for a period in the range of 2-4 hours at a stirring speed in the range of 50-200 rpm to obtain the antifoulant formulation.

In another embodiment of present disclosure, there is provided a process of preparing the antifoulant formulation as described herein, wherein said process comprising: (a) contacting at least one ammonium salt of linear alkyl benzene sulphonic acid, at least one aromatic hydrocarbon, at least one diluent, polyisobutylene succinic anhydride; and, at least one alkyl amine to obtain a first mixture; and (b) processing the first mixture at a temperature in the range of 40-50° C. for a period in the range of 2-4 hours at a stirring speed in the range of 50-200 rpm to obtain the antifoulant formulation.

In an embodiment of the present disclosure, there is provided a method of inhibiting fouling in a liquid hydrocarbon medium, the method comprising contacting the antifoulant formulation as described herein and the liquid hydrocarbon medium in the preheat exchangers of crude and short residue.

In an embodiment of the present disclosure, there is provided a method of inhibiting fouling in a liquid hydrocarbon medium, the method comprising contacting the antifoulant formulation as described herein and the liquid hydrocarbon medium, wherein the antifoulant formulation and the liquid hydrocarbon medium weight ratio is in the range of 1:500-1:200000. In another embodiment of the present disclosure, the antifoulant formulation and the liquid hydrocarbon medium weight ratio is in the range of 1:500-1:20000. In yet another embodiment of the present disclosure, the antifoulant formulation and the liquid hydrocarbon medium weight ratio is in the range of 1:500-1:2000. In a further embodiment of the present disclosure, the antifoulant formulation and the liquid hydrocarbon medium weight ratio is in the range of 1:500-1:1500. In a yet further embodiment of the present disclosure, the antifoulant formulation and the liquid hydrocarbon medium weight ratio is in the range of 1:500-1:1000.

In an embodiment of the present disclosure, there is provided a method of inhibiting fouling in a liquid hydrocarbon medium, the method comprising contacting the antifoulant formulation comprising: (a) at least one ammonium salt of linear alkyl benzene sulphonic acid; (b) at least one aromatic hydrocarbon; (c) at least one diluent; (d) polyisobutylene succinic anhydride; and (e) at least one alkylamine, and the liquid hydrocarbon medium at a temperature in the range of 350° C. to 550° C. and a pressure in the range of 250 psi to 550 psi, wherein the temperature of the liquid hydrocarbon medium is in the range of 25° C. to 160° C. and the flow rate of the liquid hydrocarbon medium is in the range of 1-3 ml/min.

In an embodiment of the present disclosure, there is provided a method of inhibiting fouling in a liquid hydrocarbon medium, the method comprising contacting the antifoulant formulation and the liquid hydrocarbon medium in the preheat exchangers of crude and/or short residue as described herein, wherein the antifoulant formulation and the liquid hydrocarbon medium weight ratio is in the range of 1:500-1:200000.

In an embodiment of the present disclosure, there is provided a method of inhibiting fouling in a liquid hydrocarbon medium, the method comprising contacting the antifoulant formulation and the liquid hydrocarbon medium in the preheat exchangers of crude and/or short residue as described herein, wherein the antifoulant formulation and the liquid hydrocarbon medium weight ratio is in the range of 1:500-1:200000.

EXAMPLES

The following examples are given by way of illustration of the present invention and should not be construed to limit the scope of the present disclosure. It is to be understood that both the preceding general description and the following detailed description are exemplary and explanatory only and are intended to provide further explanation of the claimed subject matter.

Example 1: Analysis of the Fouling Scales

Fouling scales obtained from heat exchangers were studied, and the study showed that fouling scales contain both inorganic species and organic species. Therefore, the possibilities wherein a formulation could work on quenching the organic and inorganic fouling species were explored.

Fouling in heat exchangers are also affected by the type of crude and its constituents. Therefore, different crudes were analyzed for sulfur (wt %), total basic number (TBN) and saturates, aromatics, resins, asphaltenes (SARA) for asphaltene content. These factors were taken into consideration while developing the antifoulant formulations. The analysis of the different crudes concerning its content is displayed in Table 1 below.

TABLE 1

Analysis of Crude-1, Crude-2, Crude-3, Crude-4, and Blend-1, Blend-2

| S. No. | Crude Name | API | Sulfur (wt %) | Basic Nitrogen | Asphaltene (wt %) |
|---|---|---|---|---|---|
| 1 | Crude-1 | 38.9 | 1.07 | 125 | 1.59 |
| 2 | Crude-2 | 40.5 | 1.09 | 147 | 0.19 |
| 3 | Crude-3 | 36.3 | 0.14 | 138 | 0.22 |
| 4 | Crude-4 | 29.4 | 2.78 | 460 | 2.95 |
| 5 | Blend-1 | 31.2 | 2.4 | 411 | 2.7 |
| 6 | Blend-2 | 32.6 | 2.25 | 369 | 2.1 |
| 7 | Blend 3 (short residue) | 10.1 | 6.39 | — | 5.87 |

The analysis of the short residue blend, which is Blend-3 concerning its properties is displayed in Table 2 below.

TABLE 2

Properties of Short Residue (having a boiling point of 540 and above)

| S No. | Test Name | Method | Results |
|---|---|---|---|
| 1 | Density, gm/cc | D4052 | 1.0531 |
| 2 | TBN, ppmw | UOP 269 | 1000 |
| 3 | Sulfur, wt % | D4294 | 6.39 |
| 4 | KV 135° C., cst | D7042 | 429 |
| 5 | Saturates (wt %) | IP143 | 9.95 |
| | Aromatics (wt %) | | 66.77 |
| | Resins (wt %) | | 17.37 |
| | Asphaltenes (wt %) | | 5.87 |

Example 2: Preparation of the Linear Alkyl Benzene Sulfonic Acid (LABSA) and Alkyl Amine Salts Method of Preparing Morpholine Salt of Linear Alkylbenzene Sulfonic Acid Linear alkyl benzene sulfonic acid (LABSA) (1 mmol) was added to 2-neck round bottom flask with the condenser. The flask was cooled to 15° C. Morpholine (1.5 mmol) was added slowly while stirring the reaction contents. During the morpholine addition, care was taken so that the temperature inside the flask did not exceed 50° C. After completion of the morpholine addition, the resulting mixture was continued stirring for 30 minutes to afford LAB SA-Morpholine salt.

Method of Preparing Isopropylamine Salt of Linear Alkylbenzene Sulfonic Acid

Linear alkyl benzene sulfonic acid (LABSA) (1 mmol) was added to 2-neck round bottom flask with the condenser. The flask was cooled to 15° C. Isopropylamine (IPA) (1.5 mmol) was added slowly while stirring the reaction contents. During the IPA addition, care was taken so that the temperature inside the flask did not exceed 25° C. This avoids vaporization of IPA. After completion of the IPA addition, the resulting reaction mixture was continued stirring for 30 minutes to afford LABSA-IPA salt.

Example 3: Preparation of the Antifoulant Formulations

To a flask containing LABSA-amine salt [5-20 wt %], naphthalene [2-5 wt %], polyisobutylene succinic anhydride (PIBSA) [5-20 wt %], lauryl amine [2-5 wt %] and diluent (light cycle oil for AF-15, AF-18, AF-19, AF-20, AF-21 and AF-24 (or) kerosene for AF-29, AF-30 and AF-36) [50-85 wt %] were blended while stirring between 40-50° C. The resulting reaction contents were stirred to obtain a homogeneous formulation (first mixture). To stabilize the first mixture, diethanolamine or monoethanolamine (0.1-2 wt %) were added, if required, at temperature in the range of 40-50° C. for a period in the range of 2-4 hours at a stirring speed in the range of 50-200 rpm to obtain the antifoulant formulation. Several formulations were made with varying quantities of chemical constituents and diluents to evaluate various crudes, crude blends and vacuum residue/short residue.

Example 4: Method of Inhibiting Fouling of Hydrocarbon Medium Involving the Antifoulant Formulations and Evaluation Thereof A method comprising contacting the antifoulant formulation, wherein the antifoulant formulation (having a weight percentage in the range of 0.1 to 0.15% corresponding to 1000-1500 ppm) and the liquid hydrocarbon medium (Crudes 1-4 and Blend 1-3) weight ratio is in the range of 1:600-1:1000 was performed in the laboratory. The operating conditions and parameters applied to evaluate fouling inhibition of a hydrocarbon medium by the antifoulant formulation of the present disclosure have been provided in Table 3 below.

The evaluation of antifoulant formulations was performed using Refinery Process Fouling Simulator (RPFS).

TABLE 3

Operating conditions of Antifoulant formulations

| Parameter | Operating Conditions Feed: Crude1 or Crude 2 orCrude 3or Crude 4 or Blend 1 or Blend 2 | Blend 3 (90 wt %) + Diesel (10 wt %) |
|---|---|---|
| Feed Temp | Ambient | 150° C. |
| Antifoulant dosage | 0.1 wt % | 0.15 wt % |
| Tube temperature | 400° C. | 525° C. |
| Pressure | 500 psi | 300 psi |
| Run time | 12 h | 4 h |
| Reservoir Heating | Ambient | 100° C. |
| Line Heating | Ambient | 100° C. |
| Flow rate | 1-3 ml/min | 1-3 ml/min |

The performance monitoring of the antifoulant formulations of the present disclosure was performed for different crudes and blends in terms of ΔT (difference of temperature). The ΔT values evaluated for various crudes (Crude-1 to Crude-3) and blends (Blend-1 to Blend-3) are given below.

benzene sulphonic acid, 2% by weight of alkyl amine, and 83% by weight of the diluent. The aromatic hydrocarbon and polyisobutylene succinic anhydride were absent in the formulation AF-15. The formulation AF-18 contained 10% by weight of ammonium salt of linear alkyl benzene sulphonic acid, 5% by weight of polyisobutylene succinic anhydride, and 85% by weight of the diluent. The aromatic hydrocarbon and alkyl amine were absent in the formulation AF-18. Thus, two out of the five constituents mentioned in the present disclosure were absent in the Formulations AF-15 and AF-18.

The formulation AF-19 consisted of 10% by weight of ammonium salt of linear alkyl benzene sulphonic acid, 5% by weight of polyisobutylene succinic anhydride, 2% by weight of alkyl amine, and 83% by weight of the diluent. The aromatic hydrocarbon was absent in AF-19. The formulation AF-20 comprised of 10% by weight of polyisobutylene succinic anhydride, 3% by weight of aromatic hydrocarbon, 2% by weight of alkyl amine, and 85% by weight of the diluent, linear alkyl benzene sulphonic acid is absent. Thus, one out of the five constituents mentioned in the present disclosure were absent in the Formulations AF-19 and AF-20. Further, the polyisobutylene succinic anhydride is out of the specified range (5-20 wt %) in the formulations AF-18 and AF-19.

The antifoulant formulation AF-21 has all the five components described in the present disclosure. The formulation comprised 10% by weight of ammonium salt of linear alkyl benzene sulphonic acid, 10% by weight of polyisobutylene succinic anhydride, 3% by weight of aromatic hydrocarbon, 2% by weight of alkyl amine, and 75% by weight of the diluent. The antifoulant formulation containing all the five constituents in specific weight percentages, i.e., AF-21, was found to be more effective than other formulations described in Table 4.

TABLE 4

Evaluation results for Crude-1

| Formulation | LABSA-amine salt | PIBSA | Naphthalene | Long chain amine (lauryl amine) | Diluent (light cycle oil or LCO) | ΔT for Crude-1 ° C. |
|---|---|---|---|---|---|---|
| Crude 1 without (w/o) using Antifoulant formulation | — | — | — | — | — | −66.8 |
| AF-15 | 15 wt % | — | — | 2 wt % | 83 wt % | −62.1 |
| AF-18 | 10 wt % | 5 wt % | — | — | 85 wt % | −33.1 |
| AF-19 | 10 wt % | 5 wt % | — | 2 wt % | 83 wt % | −39.1 |
| AF-20 | — | 10 wt % | 3 wt % | 2 wt % | 85 wt % | −19.6 |
| AF-21 | 10 wt % | 10 wt % | 3 wt % | 2 wt % | 75 wt % | −14.6 |

The evaluation results for Crude-1 is tabulated in Table 4 above. The graphical representation is provided in FIG. 1 of the present disclosure.

It is to be noted that fouling is caused due to number of factors via different mechanisms, therefore for an effective antifouling, a formulation is required which can arrest all types of fouling. The antifoulant formulation of the present disclosure effectively arrests fouling for Crude-1, quenching both the organic and inorganic fouling species. This is evident from the results described in Table 4.

Light Cycle Oil (LCO), or kerosene and/or highly aromatic-rich hydrocarbon having up to 55% aromatics were used as the diluents in the antifoulant formulations of the present disclosure.

Various antifoulant formulations, such as, AF-15, AF-18, AF-19, AF-20, and AF-21 were mixed with crude 1 to evaluate the antifoulant efficacy. The AF-15 formulation contained 15% by weight of ammonium salt of linear alkyl The efficacy of all the antifoulant formulations were tested in terms of the ΔT values for Crude 1. The lower the value of ΔT, the better was the performance. The ΔT values for the formulations AF-15, AF-18, AF-19 and AF-20 which do not have all the five components were found to have a high ΔT value when compared with the antifoulant formulation AF-21 which had all the five components. The ΔT value attained for AF-21 was −14.6° C., which was the lowest when compared the control crude-1 without antifoulant formulation of the present disclosure (AF-21).

It is therefore concluded that the components in the specified weight percentage were essential to obtain an effective antifoulant formulation. Any deviation in the weight percentage or the absence of any component compromised the efficacy.

Additional set of antifoulant formulations were prepared, such as, AF-24, AF-29, AF-30, and AF-36, and evaluated for their antifoulant efficacy against Blend-3. The efficacy results of the various antifoulant formulation against Blend-3 containing short residue (SR) is further tabulated in Table 5 below.

The AF-24 (composition provided below in Table 5) formulation contained only two components out of five, namely, 20% by weight of ammonium salt of linear alkyl and 80% by weight of the diluent (light cycle oil). The components alkyl amine, aromatic hydrocarbon, and polyisobutylene succinic anhydride were absent. Similarly, AF-30 comprised only three out of five components, i.e., 20% by weight of ammonium salt of linear alkyl, 5% by weight of polyisobutylene succinic anhydride and 75% by weight of the diluent. The components alkylamine, and aromatic hydrocarbon were absent.

The antifoulant formulation AF-29 contained all the five components, i.e., 20% by weight of ammonium salt of linear alkyl benzene sulphonic acid, 5% by weight of polyisobutylene succinic anhydride, 3% by weight of aromatic hydrocarbon, 2% by weight of alkyl amine and 70% by weight of the diluent. Similarly, AF-36 contained all the five components, viz., 20% by weight of ammonium salt of linear alkyl benzene sulphonic acid, 10% by weight of polyisobutylene succinic anhydride, 3% by weight of aromatic hydrocarbon, 2% by weight of alkylamine and 65% by weight of the diluent.

From Table 5 it is inferred that the antifoulant formulations of the present disclosure, i.e., AF-36 and AF-29, which had all the components in specified ranges were found to be more effective than other formulations.

Crude-1. AF-29 (composition provided above in Table 5) proved to be the best antifoulant formulation for Crude 2 and Blend 2 on the basis of ΔT values as illustrated in Table 6. Similarly, for Crude 3, and Blend 1 antifoulant formulation AF-21 provided best results with respect to the ΔT values.

In view of the above, it is observed that the antifouling formulation of the present disclosure is able to arrest almost all types of fouling to merit as effective antifouling formulation which has been validated by testing various crudes and blends. Therefore, the antifoulant formulation of the present disclosure is technically advanced over the antifoulant formulations known in the art.

Although the subject matter has been described in considerable details with reference to certain examples and embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the present subject matter as defined.

Advantages of the Antifoulant Formulations

The present disclosure provides a high-performance antifoulant formulation comprising ionic surfactants based on alkylbenzene sulfonates and amines, polyisobutylene succinic anhydride, naphthalene, and aromatic-rich diluents, for reducing fouling, including particulate-induced fouling, in heat exchangers of crude and vacuum residue in the hydrocarbon refining process.

TABLE 5

Evaluation results of Blend-3

| Formulation | LABSA-amine salt | PIBSA | Naphthalene | Long chain amine (lauryl amine) | Diluent | ΔT (° C.) for Blend-3 (SR) |
|---|---|---|---|---|---|---|
| Without (w/o) using Antifoulant formulation | — | — | — | — | — | −32.7 |
| AF-24 | 20% | — | — | — | 80% LCO | −20.9 |
| AF-29 | 20 wt % | 5 wt % | 3 wt % | 2 wt % | 70 wt % kerosene | −19.7 |
| AF-30 | 20% | 5 wt % | — | — | 75% kerosene | −26.2 |
| AF-36 | 20% | 10% | 3 wt % | 2% | 65% kerosene | −17 |

The present disclosure further illustrates the evaluation of the antifoulant formulation of the present disclosure against other crudes (Crude-2 and Crude-3) and blends (Blend-1 and Blend-2) concerning their ΔT values.

TABLE 6

Evaluation results of Crude-2, Crude-3, Blend-1, and Blend-2.

| S. No. | Crude/blend | ΔT (° C.) Without (w/o) using Antifoulant formulation | ΔT (° C.) With Antifoulant formulation |
|---|---|---|---|
| 1 | Crude-2 | −35.6 | −5.2 |
| 2 | Crude-3 | −31.8 | −1.5 |
| 3 | Blend-1 | −20.6 | −4.6 |
| 4 | Blend-2 | −37.6 | −7.3 |

The evaluation results for Crude-2, and Crude-3 along with Blend-1, and Blend-2 are tabulated in Table 6 above. The evaluation was carried out similarly as stated above for The antifoulant formulation of the present disclosure when evaluated for a series of crudes and vacuum residue using refinery process fouling simulator (RPFS) showed excellent results compared to corresponding runs without antifoulant formulations. The evaluation studies are not only limited to the heat exchangers of crudes, blends and short residue but can also be used in the heat exchangers of DHDS unit, vis-breaker units, and other refinery applications.

We claim:

1. An antifoulant formulation comprising:

(a) at least one salt of a linear alkyl benzene sulphonic acid selected from the group consisting of a morpholine salt and an isopropylamine salt;

(b) at least one aromatic hydrocarbon;

(c) at least one diluent;

(d) polyisobutylene succinic anhydride; and (e) at least one alkyl amine.

2. The antifoulant formulation as claimed in claim 1, wherein a weight ratio of the at least one salt of linear alkyl benzene sulphonic acid to the at least one aromatic hydrocarbon is in a range of 1:1-10:1.

3. The antifoulant formulation as claimed in claim 1, wherein a weight ratio of the at least one salt of linear alkyl benzene sulphonic acid to the polyisobutylene succinic anhydride is in a range of 0.25:1-10:1.

4. The antifoulant formulation as claimed in claim 1, wherein a weight ratio of the at least one salt of linear alkyl benzene sulphonic acid to the at least one alkyl amine is in a range of 1:1-20:1.

5. The antifoulant formulation as claimed in claim 1, wherein a weight ratio of the at least one salt of linear alkyl benzene sulphonic acid to the at least one diluent is in a range of 0.05:1-0.4:1.

6. The antifoulant formulation as claimed in claim 1, wherein the at least one salt of linear alkyl benzene sulphonic acid has a weight percentage in a range of 5-20% with respect to the antifoulant formulation; the at least one aromatic hydrocarbon has a weight percentage in a range of 2-5% with respect to the antifoulant formulation; the at least one diluent has a weight percentage in a range of 50-85% with respect to the antifoulant formulation; the polyisobutylene succinic anhydride has a weight percentage in a range of 5-20% with respect to the antifoulant formulation; the at least one alkyl amine has a weight percentage in a range of 1-5% with respect to the antifoulant formulation.

7. The antifoulant formulation as claimed in claim 1, wherein the at least one aromatic hydrocarbon is naphthalene, wherein naphthalene is substituted with $C_{1-6}$ alkyl, $C_{1-6}$ haloalkyl, $C_{2-6}$ alkenyl, $C_{2-6}$ alkynyl, $C_{1-6}$ alkoxy, $C_{3-6}$ cycloalkyl, or $C_{5-6}$ aryl.

8. The antifoulant formulation as claimed in claim 1, wherein the at least one diluent is selected from the group consisting of light cycle oil, kerosene, aromatic-rich hydrocarbon diluents, diesel, mineral turpentine oil (MTO), and combinations thereof.

9. The antifoulant formulation as claimed in claim 1, wherein the at least one alkyl amine is selected from the group consisting of $C_{12}$ amine, $C_8$ amine, $C_9$ amine, $C_{10}$ amine, $C_{11}$ amine, $C_{13}$ amine, $C_{14}$ amine, $C_{16}$ amine, $C_{17}$ amine, $C_{18}$ amine, and combinations thereof.

10. A process of preparing the antifoulant formulation as claimed in claim 1, the process comprising: (a) contacting the components of claim 1 to obtain a first mixture; and (b) processing the first mixture to obtain the antifoulant formulation.

11. The process as claimed in claim 10, wherein processing the first mixture is carried out at a temperature in the range of 40-50° C. for a period in the range of 2-4 hours at a stirring speed in the range of 50-200 rpm to obtain the antifoulant formulation.

12. A method of inhibiting fouling in a liquid hydrocarbon medium, the method comprising contacting the antifoulant formulation as claimed in claim 1, and the liquid hydrocarbon medium in the preheat exchangers of crude and short residue.

13. The method, as claimed in claim 12, wherein the antifoulant formulation and the liquid hydrocarbon medium weight ratio is in the range of 1:500-1:200000.

* * * * *